United States Patent
Hong

(10) Patent No.: US 7,430,032 B2
(45) Date of Patent: Sep. 30, 2008

(54) MULTI-DOMAIN LIQUID CRYSTAL DISPLAY DEVICE AND FABRICATION METHOD WITH CENTRAL AND PERIPHERAL CONTROL ELECTRODES FORMED ON SAME LAYER AND PLURALITY OF FIELD DISTORTION SLITS FORMED IN PIXEL ELECTRODE

(75) Inventor: Hyung-Ki Hong, Seoul (KR)

(73) Assignee: LG Display Co., Ltd., Seoul (KR)

( * ) Notice: Subject to any disclaimer, the term of this patent is extended or adjusted under 35 U.S.C. 154(b) by 378 days.

(21) Appl. No.: 11/259,058

(22) Filed: Oct. 27, 2005

(65) Prior Publication Data
US 2006/0092360 A1    May 4, 2006

(30) Foreign Application Priority Data
Oct. 29, 2004  (KR) ............... 10-2004-0087482
Feb. 24, 2005  (KR) ............... 10-2005-0015550

(51) Int. Cl.
*G02F 1/1337* (2006.01)
(52) U.S. Cl. .................................. 349/129; 349/130
(58) Field of Classification Search .............. 349/129, 349/130
See application file for complete search history.

(56) References Cited

U.S. PATENT DOCUMENTS

| | | | | |
|---|---|---|---|---|
| 6,462,798 | B1 * | 10/2002 | Kim et al. | 349/129 |
| 6,760,087 | B2 * | 7/2004 | Wu et al. | 349/130 |
| 7,113,239 | B2 * | 9/2006 | Chin et al. | 349/129 |
| 2002/0060764 | A1 * | 5/2002 | Taniguchi et al. | 349/130 |

FOREIGN PATENT DOCUMENTS

| | | |
|---|---|---|
| KR | 2001-0049146 | 6/2001 |
| KR | 2004-0023535 | 3/2004 |

* cited by examiner

*Primary Examiner*—David C Nelms
*Assistant Examiner*—John Heyman
(74) *Attorney, Agent, or Firm*—Morgan, Lewis & Bockius LLP

(57) ABSTRACT

A multi-domain LCD device includes first and second substrates, gate and data lines defining a plurality of pixel regions on the first substrate, at least one first electric field distortion unit formed at the pixel region, a pixel electrode formed at the pixel region and having at least one second electric field distortion unit, a common electrode formed on the second substrate, and a liquid crystal layer formed between the first and second substrates, having liquid crystal molecules symmetrically arranged by the first electric field distortion unit and having a plurality of domains generated by the first and second electric field distortion units.

22 Claims, 16 Drawing Sheets

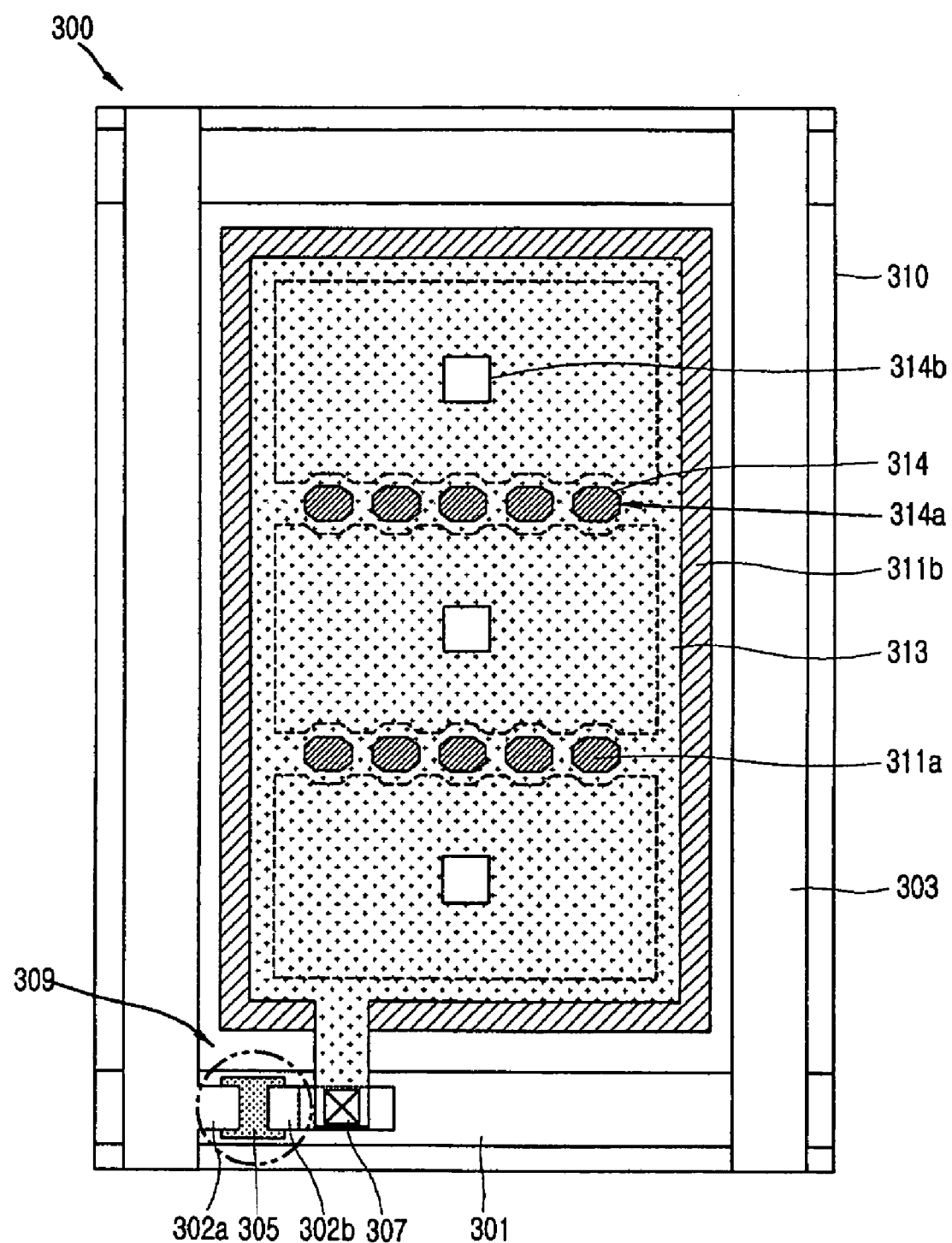

MULTI-DOMAIN LIQUID CRYSTAL DISPLAY DEVICE AND FABRICATION METHOD WITH CENTRAL AND PERIPHERAL CONTROL ELECTRODES FORMED ON SAME LAYER AND PLURALITY OF FIELD DISTORTION SLITS FORMED IN PIXEL ELECTRODE

This application claims the benefit of Korean Application Nos. 2004-87482 and 2005-15550, filed Oct. 29, 2004 and Feb. 24, 2005, respectively, which are hereby incorporated by reference.

BACKGROUND OF THE INVENTION

1. Field of the Invention

The present invention relates to a liquid crystal display (LCD) device and, more particularly, to an LCD device and its fabrication method capable of obtaining a wide viewing angle and enhancing an aperture ratio.

2. Discussion of the Related Art

The LCD device, which has been well-known as a high picture quality and low power flat panel display device, includes a thin film transistor (TFT) array substrate and a color filter substrate attached with a uniform interval, in which a liquid crystal layer is formed. Further, the TFT array substrate includes pixels arranged in a matrix form, each unit pixel including a TFT, a pixel electrode and a capacitor. The color filter substrate includes a common electrode formed on the entire surface of the color filter substrate, RGB color filters and a black matrix. The common electrode and the pixel electrode serve to apply electric field to the liquid crystal layer.

An alignment film is formed on facing surfaces of the TFT array substrate and the color filter substrate, and rubbing is performed to arrange the liquid crystal layer in a certain direction. When the electric field is applied between the pixel electrode and the common electrode, liquid crystals rotate due to dielectric anisotropy to transmit or block light according to each unit pixel, thereby displaying a character or an image.

However, the above-described LCD device is a twisted nematic (TN) mode LCD device, a viewing angle of which is narrow. Such a disadvantage results from refractive anisotropy of liquid crystal molecules. That is, with the TN mode, light transmittance is symmetrically distributed with respect to a horizontal viewing angle but is asymmetrically distributed with respect to a vertical viewing angle, thereby causing a range of image inversion and thus narrowing the viewing angle.

In order to solve the problem of viewing angle, there have been proposed a film compensation mode LCD device for compensating the viewing angle with a compensation film, a multi-domain mode LCD device for dividing a pixel into several domains and compensating the viewing angle by making a direction of each main viewing angle of each domain different, an in-plane electric field mode LCD device for forming in-plane electric field by positioning two electrodes on the same substrate, an OCB (Optically Compensated Birefringence mode LCD) device, a vertical alignment (VA) mode LCD device, and the like.

For example, the vertical alignment (VA) mode LCD device utilizes liquid crystals with a negative type dielectric anisotropy and a vertical alignment film. When a voltage is not applied, liquid crystal molecules are arranged such that the longer axis of each molecule is vertical to the planar surface of the alignment film and a polarization plate attached on a substrate is disposed such that a polarization axis is perpendicular to the longer axis of each molecule to display a normally black mode. In contrast, when a voltage is applied, due to characteristics of the negative type liquid crystal molecules being slantedly aligned with respect to electric field, the liquid crystal molecules having their longer axes in a perpendicular direction to the planar surface of the alignment film are moved toward the planar surface of the alignment film to allow light to be transmitted. In the VA mode LCD device, a structure such as a side-electrode or rib, or an electric field distortion slit is formed on a substrate to distort the electric field generated at the liquid crystal layer to position a director of liquid crystal molecules in a desired direction. For example, there is PVA (Pattern Vertical Alignment) or an MVA (Multi-domain Vertical Alignment).

FIGS. 1 and 2 are cross-sectional views showing the unit pixel of a related art VA mode LCD device with a viewing angle improved by the multi-domain. FIG. 1 shows the LCD device utilizing only electric field distortion slits as an electric field distorting unit and FIG. 2 shows the LCD device utilizing a rib.

As shown in FIGS. 1 and 2, a VA mode LCD device 10 includes first and second substrate 1 and 2, and a liquid crystal layer 7 formed therebetween. Though not shown, a plurality of gate lines and data lines are arranged horizontally and vertically to define pixel regions on the first substrate 1, and a TFT is formed at the crossing of the gate line and the data line. A pixel electrode 3 electrically connected with the TFT is formed at the pixel region. A common electrode 4 for generating electric field together with the pixel electrode 3 to drive liquid crystal molecules 9 is formed on the second substrate 2. Though not shown, a black matrix for blocking light leaked from the gate/data lines and TFT and a color filter for implementing color are also formed on the second substrate 2. Electric field distortion slits 6a and 6b for generating distortion of electric field are formed at the pixel electrode 3 and the common electrode 4, respectively. The electric field distortion slits 6a and 6b distort the electric field to divide a domain into several regions to create a multi-domain. In this related art, a rib 8 is formed on the second substrate 2.

In the LCD device 10, when a voltage above a threshold value is applied to the pixel electrode 3 and the common electrode 4, the liquid crystal molecules, which have been arranged such that their longer axes are perpendicular to the planar surface of the substrate, are slanted in a horizontal direction, and therefore, the electric field is distorted by the electric field distortion slit 6b or the rib 8 to make the liquid crystal molecules arranged in a different direction centering around the electric field distortion slit 6b or the rib 8. Accordingly, the liquid crystal directors face each other to compensate the viewing angle, thereby obtaining a wide viewing angle.

However, the related art LCD device has the following problems. If the first and second substrates 1 and 2 are not precisely attached, the position of the electric field distortion slits 6a formed on the pixel electrode and the position of the electric field distortion slit 6a or the rib 8 formed on the common electrode will not be accurate, thereby changing an area ratio of the domain, and degrading viewing angle characteristics and display quality.

SUMMARY OF THE INVENTION

Accordingly, the present invention is directed to a multi-domain liquid crystal display device and fabrication method thereof that substantially obviate one or more of the problems due to limitations and disadvantages of the related art.

An object of the present invention is to provide a liquid crystal display (LCD) device capable of preventing degradation of viewing angle characteristics due to misalignment of an upper substrate and a lower substrate, and its fabrication method.

Another object of the present invention is to provide a multi-domain LCD device capable of enhancing a viewing angle by forming an electric field distortion unit only at a lower substrate, and its fabrication method.

Still another object of the present invention is to provide an LCD device capable of enhancing an aperture ratio by reducing a formation area of an electric field distortion unit, and its fabrication method.

Additional features and advantages of the invention will be set forth in the description which follows, and in part will be apparent to those having ordinary skill in the art upon examination of the following or may be learned from practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described herein, there is provided a multi-domain LCD device including a first substrate and a second substrate facing each other, gate lines and data lines defining a plurality of pixel regions on the first substrate, at least one first electric field distortion unit formed at the plurality of the pixel regions, a pixel electrode formed at the plurality of the pixel regions and including at least one second electric field distortion unit, a common electrode formed on the second substrate, and a liquid crystal layer formed between the first and second substrates, wherein the liquid crystal layer includes liquid crystal molecules that are symmetrically arranged by the first electric field distortion unit, and a plurality of domains formed by the first and second electric field distortion units.

In another aspect of the present invention, there is also provided a method for fabricating a multi-domain liquid crystal display (LCD) device including preparing a first substrate and a second substrate, forming an electric field distortion pattern on the first substrate, forming a passivation film on the first substrate including the electric field distortion pattern, forming a pixel electrode having an electric field distortion slit on the passivation film, forming a common electrode on the second substrate, and forming a liquid crystal layer between the first and second substrates, wherein the liquid crystal layer is symmetrically arranged by the electric field distortion pattern and includes a plurality of domains generated by the electric field distortion pattern and the electric field distortion slit.

In another aspect of the present invention, there is also provided a method for fabricating a multi-domain liquid crystal display (LCD) device including preparing a first substrate and a second substrate, the first substrate including gate and data lines to define a plurality of pixel regions, forming a first liquid crystal control electrode and a second liquid crystal control electrode on the first substrate, forming a passivation film on the first substrate including the plurality of liquid crystal control electrodes, forming a first electric filed distortion slit and a second electric field distortion slit on the passivation film, the first electric field distortion slit having a plurality of holes continuously disposed to be spaced apart at an interval, forming a common electrode on the second substrate, and forming a liquid crystal layer including a symmetrical arrangement based on the first liquid crystal control electrode, and a plurality of domains by the first liquid crystal control electrode and the first electric field distortion slit.

It is to be understood that both the foregoing description and the following detailed description of the present invention are exemplary and explanatory and are intended to provide further explanation of the invention claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIGS. 3A and 3B illustrate an embodiment of a multi-domain LCD device in accordance with the present invention, of which FIG. 3A is a plan view showing a unit pixel, and FIG. 3B is a sectional view taken along line I-I' in FIG. 3A;

FIGS. 9A to 9C are enlarged views illustrating a first electric field distortion slit and a first liquid crystal control electrode, of which FIG. 9A is an enlarged view of a portion 'A' in FIG. 8, FIG. 9B is a sectional view taken along line II-II' in FIG. 9A; and FIG. 9C is a sectional view taken along line III-III' in FIG. 9A;

FIGS. 12 and 13 show different embodiments of the present invention; and

DETAILED DESCRIPTION OF THE PREFERRED EMBODIMENT

Reference will now be made in detail to the preferred exemplary embodiments of a multi-domain liquid crystal display (LCD) device and its fabrication method of the present invention, examples of which are illustrated in the accompanying drawings.

Figure 1:
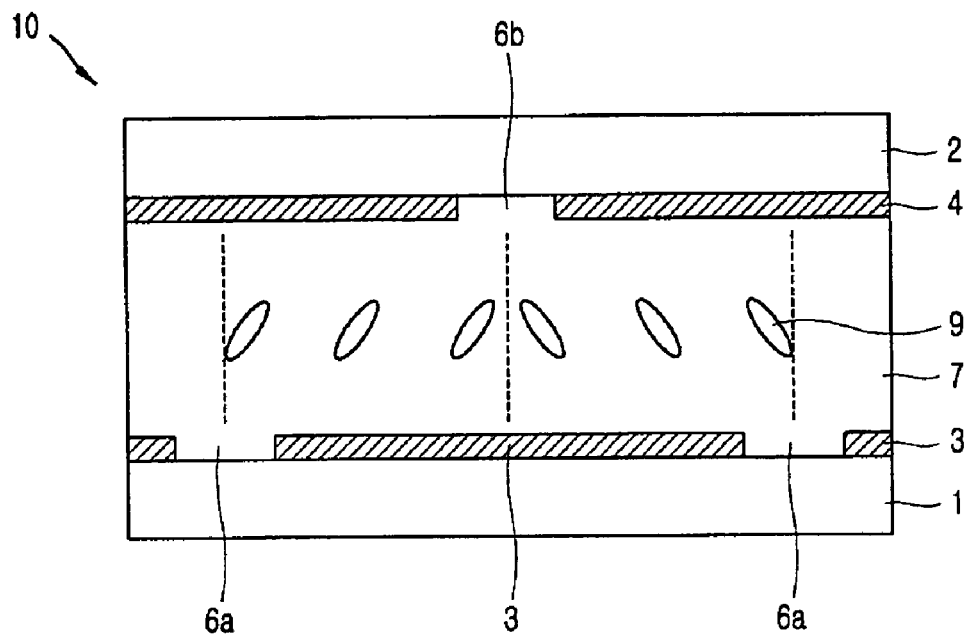
FIG. 1 illustrates a section of a unit pixel of a multi-domain LCD device utilizing electric field distortion slits in accordance with the related art.
Figure 2:
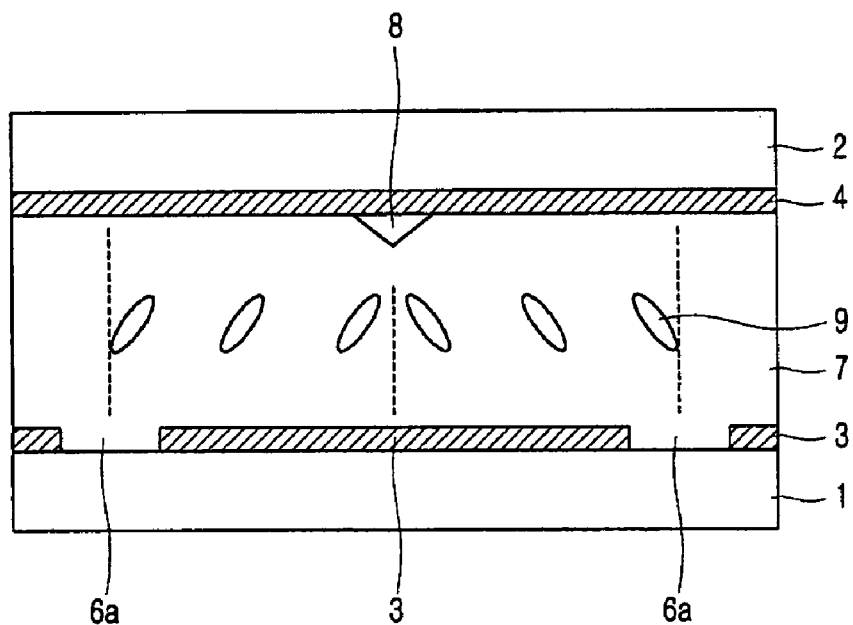
FIG. 2 illustrates a section of a unit pixel of a multi-domain LCD device utilizing a rib in accordance with the related art.
Figure 3A:
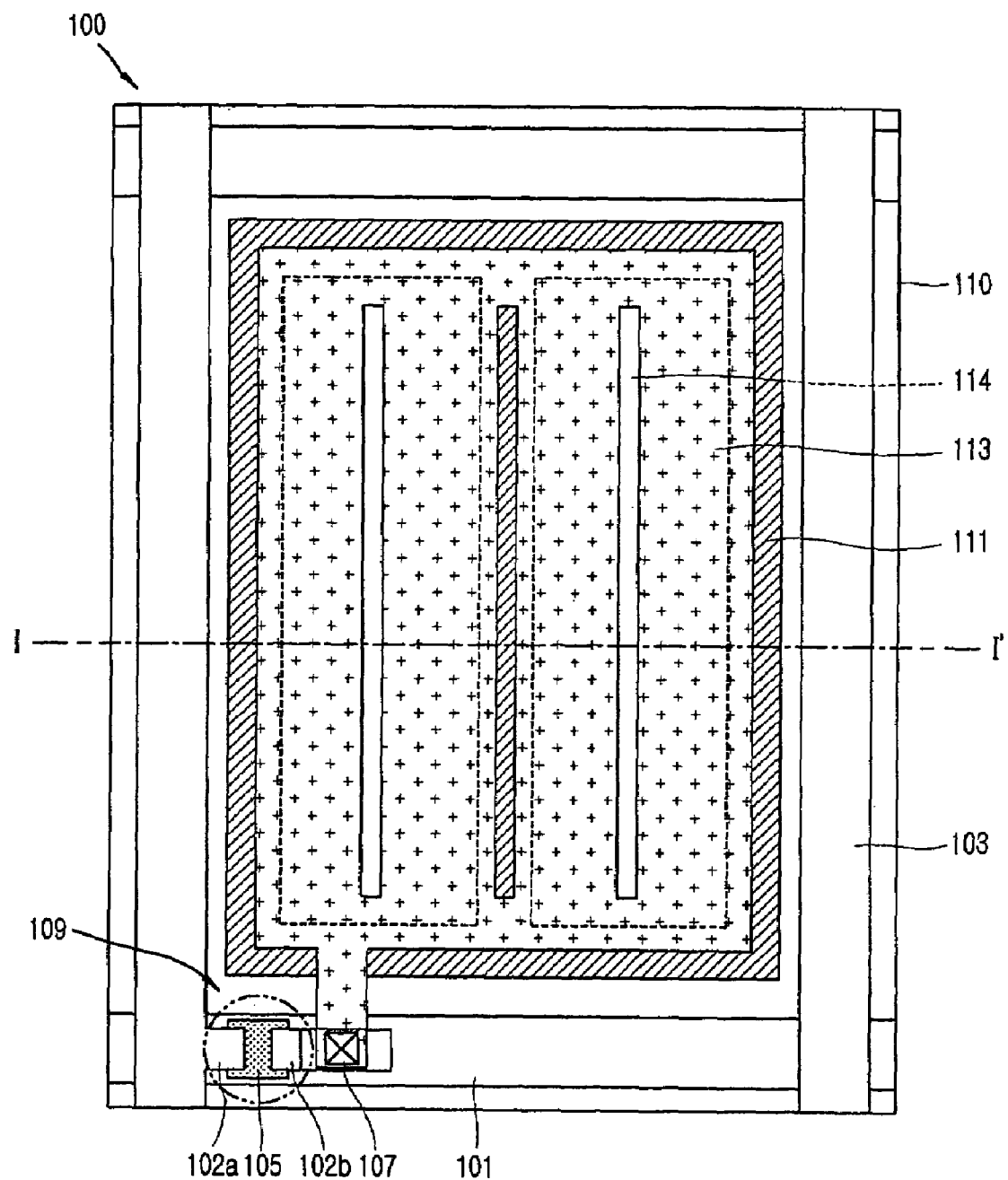
Figure 3B:
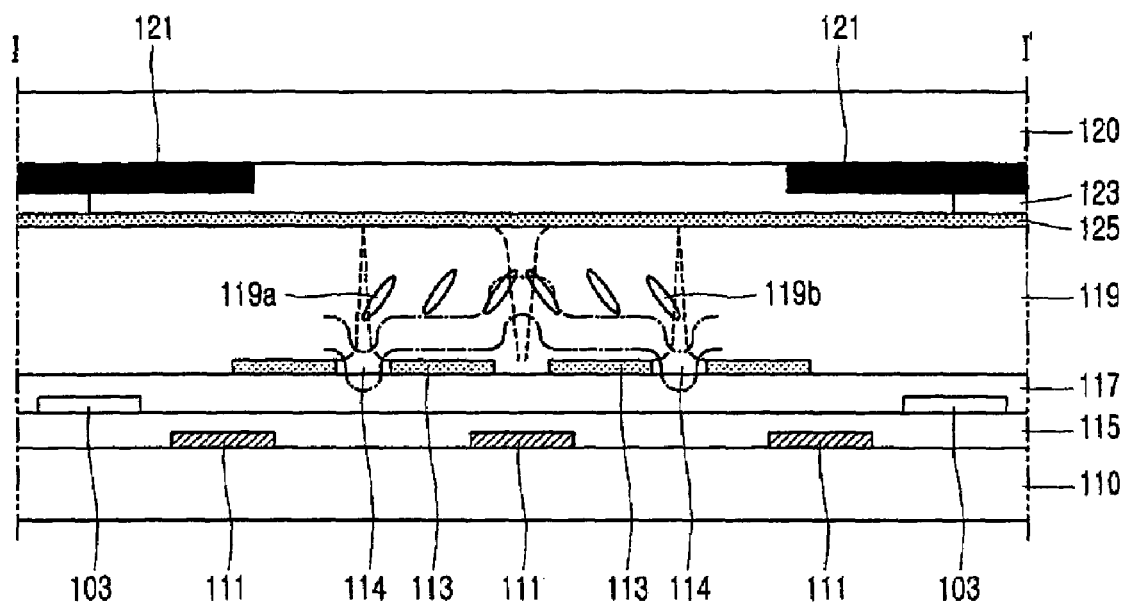

FIGS. 3A and 3B illustrate an exemplary embodiment of a multi-domain LCD device in accordance with the present invention. FIG. 3A is a plan view showing a unit pixel, and FIG. 3B is a cross-sectional view taken along line I-I' in FIG. 3A. As shown in FIG. 3B, a multi-domain LCD device 100 (FIG. 3A) includes first and second substrates 110 and 120, and a liquid crystal layer 119 formed therebetween. Also, as shown in FIG. 3A, the first substrate 110 is provided with a plurality of gate lines 101 and a plurality of data lines 103 horizontally and vertically arranged to define pixel regions, and a thin film transistor (TFT)109 formed at each crossing of the gate line 101 and the data line 103. The TFT 109 includes a gate electrode formed of a gate line 101, a semiconductor layer 105 formed on the gate line 101, and source/drain electrodes 102a and 102b formed on the semiconductor layer 105. In this exemplary embodiment, the gate electrode may be formed by extending the gate line 101. A pixel electrode 113 is formed at the pixel region, and is electrically connected with the drain electrode 102b through a drain contact hole 107. Moreover, the pixel electrode 113 includes a plurality of electric field distortion slits 114 for distorting electric field.

Referring to FIG. 3B, a liquid crystal control electrode 111 is formed on the first substrate 110 to form a plurality of domains by distorting the electric field together with the electric field distortion slits 114. A gate insulation film 115 and a passivation film 117 are formed at an upper portion of the liquid crystal control electrode 111. In this exemplary embodiment, the liquid crystal control electrode 111 may be formed on the gate insulation film 115, and the pixel electrode 113 be formed on the passivation film 117. As shown in FIG. 3A, the liquid crystal control electrode 111 may be formed at an outer edge of a pixel adjacent to the data line 103 in order to effectively prevent an influence of a signal of the data line 103 on the pixel electrode 113. A black matrix 121 is formed on the second substrate 120 in order to block light leaked from the gate line 101, the data line 103 and the TFT 109. A color filter 123 is formed on the black matrix 121. A common electrode 125 is formed on the color filter 123 to generate electric field together with the pixel electrode 113 to drive the liquid crystal layer 119. The pixel electrode 113 and the common electrode 125 may be made of a transparent conductive material such as ITO (Indium Tin Oxide), IZO (Indium Zinc Oxide), or the like.

In such an exemplary arrangement, when a voltage at or above a threshold value is applied to the pixel electrode 113 and the common electrode 125, liquid crystal molecules 119a and 119b are driven by electric field (indicated by curved dotted lines) generated by the pixel electrode 113 and the common electrode 125. As shown in FIG. 3B, the electric field are symmetrical (left and right) based on the liquid crystal control electrode 111 formed on the first substrate 110 and the electric field distortion slit 114 formed at the pixel electrode 113. Accordingly, the liquid crystal molecules 119a and 119b arranged along the direction of the electric field are symmetrical centering on the liquid crystal control electrode 111.

Figure 4:
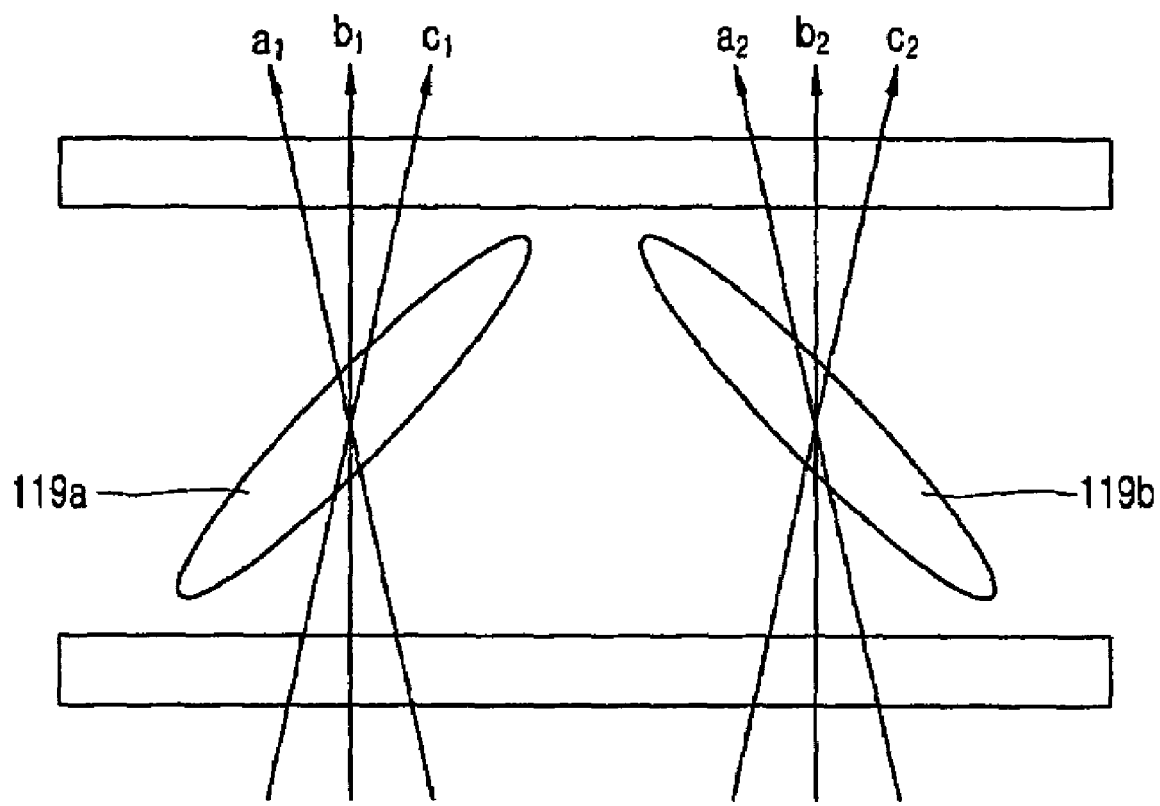
FIG. 4 illustrates a viewing angle compensation principle in accordance with the present invention.

When the liquid crystal molecules 119a and 119b are formed to have the symmetrical arrangement by the liquid crystal control electrode 111 and the electric field distortion slit 114, a plurality of domains are created to widen a viewing angle. In other words, as shown in FIG. 4, in a case of two domains that the liquid crystal molecules 119a and 119b are arranged to be symmetrical, a birefringence value of $a_1$ of the liquid crystal molecule 119a is compensated by a birefringence value of $a_2$ of the liquid crystal molecule 119b having an arrangement of molecules in the opposite direction to that of the liquid crystal molecule 119a, resulting in a birefringence value of '0'. Similarly, a birefringence value of $c_1$ is compensated by $c_2$. In this manner, the viewing angle is compensated by forming the multi-domain to thereby prevent degradation of picture quality according to the viewing angle.

In this exemplary embodiment, the electric field distortion units, namely, the electric field distortion slits 114 and the liquid crystal control electrode 111, are all formed at the first substrate (lower substrate) 110, and thereby preventing degradation of viewing angle characteristics due to misalignment between the upper and lower substrates. In the related art, since the electric field distortion units (e.g., the electric field distortion slit or the rib) are formed on the upper and lower substrates, respectively, misalignment, which is caused when the upper and lower substrates are attached, makes each area of the symmetrical domains different, thereby degrading viewing angle characteristics. Unlike the related art, in the present invention, since the electric field distortion units (the electric field distortion slits and the liquid crystal control electrode) are formed at the same lower substrate, asymmetry of domain regions due to misalignment of the upper and lower substrates can be avoided, thereby preventing degradation of viewing angle characteristics and obtaining a wide viewing angle.

As described above, in order to create the domains having the liquid crystal molecules 109a and 109b arranged symmetrical based on the liquid crystal control electrode 111, a common voltage ($V_{com}$) of about 3.3V is applied to the common electrode 125, a pixel electrode ($V_p$) for controlling light transmittance is applied to the pixel electrode 113, and some −5V low gate voltage ($V_{gl}$) is applied to the liquid crystal control electrode 111. Long time application of the DC voltage to liquid crystals causes degradation of characteristics of the liquid crystals. Thus, polarity of the applied voltage, namely, the pixel electrode ($V_p$), needs to be periodically changed for operation. In this respect, however, if a signal of the pixel voltage has a positive polarity ($V_{p(+)}$) and a signal of the liquid crystal control electrode 111 is a low gate voltage ($V_{gl}$;−5V), the domains with liquid crystal molecules 109a and 109b arranged symmetrical based on the liquid crystal control electrode 111 are not formed. In other words, the liquid crystal molecules 109a and 109b are not arranged in a direction of facing each other in each domain based on the boundary of the liquid crystal control electrode 111 but arranged in the opposite directions near the liquid crystal control electrode 111.

Accordingly, in order to solve such a problem, in the present invention, the signal of the liquid crystal control electrode 111 is adjusted to be the same as the polarity of the pixel voltage and applied. In other words, if the signal of the pixel voltage has a negative polarity, a liquid crystal control signal ($V_{min}$) lower than the pixel voltage ($V_{p(−)}$) is applied to the liquid crystal control electrode 111, and if the signal of the pixel voltage has the positive polarity, a liquid crystal control signal higher than the pixel voltage ($V_{p(+)}$) is applied to the liquid crystal control electrode 111. That is, in order to make the domains symmetrical with the same arrangement of the liquid crystal molecules 109a and 109b, a voltage difference ($V_{p(−)}−V_{min}$) between a minimum liquid crystal control signal ($V_{min}$) applied when the signal of the pixel voltage has the negative polarity and the pixel voltage ($V_{p(−)}$) and a voltage difference ($V_{max}−V_{p(+)}$) between a maximum liquid crystal control signal ($V_{max}$) applied when the signal of the pixel voltage has the positive polarity and the pixel voltage ($V_{p(+)}$) must satisfy the same conditions.

Driving inversion includes frame inversion, line inversion, dot inversion and the like. In the dot inversion, a negative polarity pixel voltage signal and a positive polarity pixel voltage are alternately applied to each unit pixel. Thus, in case of the dot inversion, the minimum liquid crystal control signal ($V_{min}$) and the maximum liquid crystal control signal ($V_{max}$) must be applied alternately.

Figure 5:
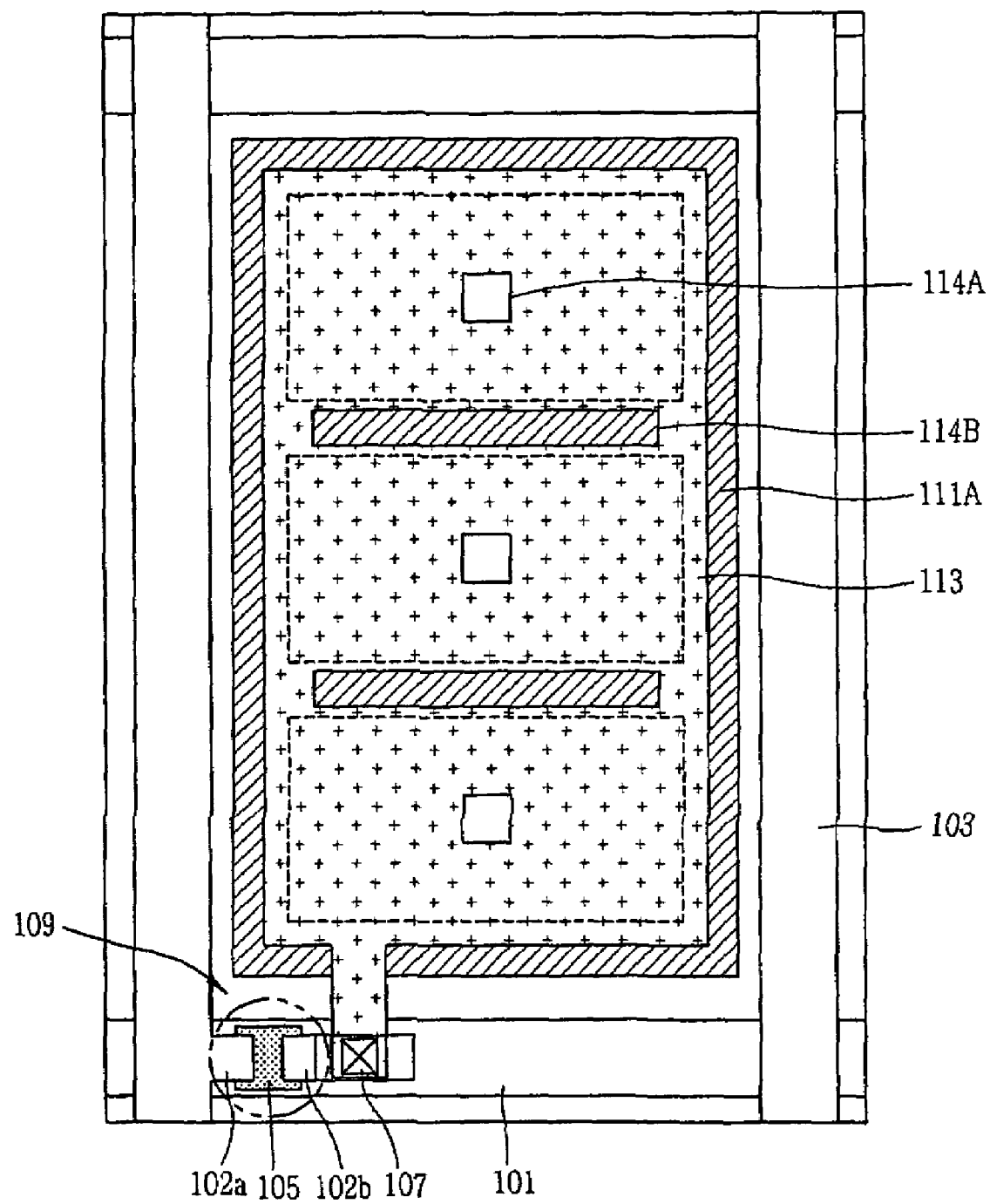
FIG. 5 illustrates one structure of an electric field distortion unit.
Figure 6:
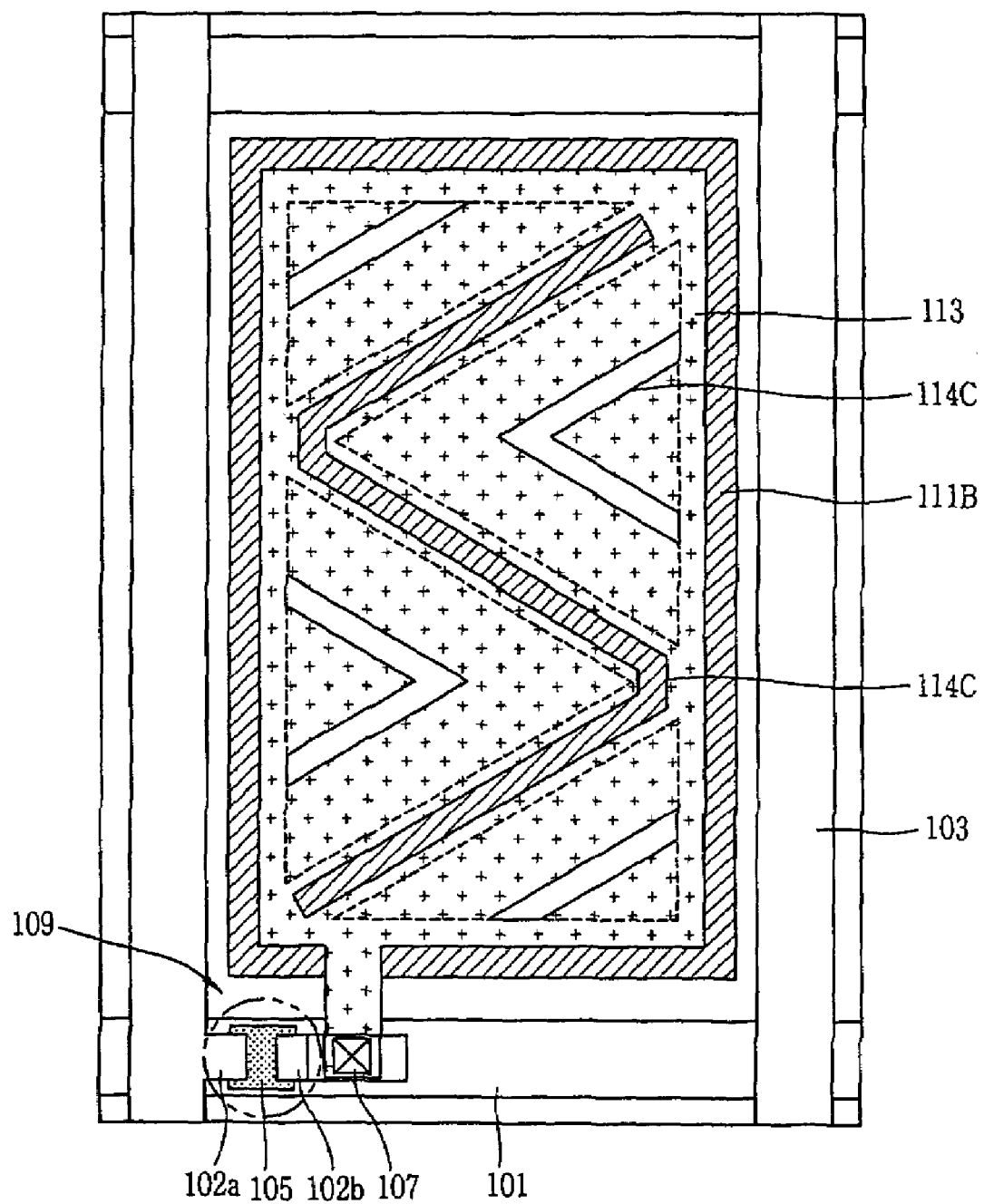
FIG. 6 illustrates another structure of the electric field distortion unit.

In the present invention, the electric field distortion units do not need to limit to a specific form but may be variably changed to a zigzag form or the like. FIGS. 5 and 6 illustrate different examples of the electric field distortion units in accordance with another exemplary embodiment of the present invention, which have the same structure as that of the previous embodiment (FIGS. 3A and 3B), except for the form of the liquid crystal control electrode and the electric field distortion slits. The same reference numerals are given to the same elements.

As shown in FIG. 5, a plurality of electric field distortion slits 114A and 114B are formed as an electric field distortion unit on the pixel electrode 113, and a liquid crystal control electrode 111A may be formed to distort electric field together with the electric field distortion slits 114A and 114B to form multi-domain and divide a pixel region defined by the gate line 101 and the data line 103 into a plurality of regions. The electric field distortion slit 114A is formed at a central portion of each divided region of the pixel region divided by the liquid crystal control electrode 111A. The electric field distortion slit 114B is formed at a position corresponding to the liquid crystal control electrode 111A and is disposed in parallel with the gate line 101. As described above, the liquid crystal control electrode 111A and the electric field distortion slits 114A and 114B form a continuous domain so that the longer axes of liquid crystal molecules are arranged to face the electric field distortion slit 114A at each divided region.

As shown in FIG. 6, the liquid crystal control electrode 111B and the electric field distortion slit 114C may have a bent structure in a zigzag form, and by forming the liquid crystal control electrode 111B and the electric field distortion slit 114C with the bent structure, four-domain can be created.

Though not shown, the liquid crystal control electrodes 111, 111A and 111B are electrically connected with neighbor pixels, and a connection pattern for applying the liquid crystal control signal is separately formed. The connection pattern may be formed along the side of the gate line 101 or formed side by side with the data line 103. If the liquid crystal control electrode 111 is formed on the same plane on which the gate line 101 is formed, the connection pattern is formed along the side of the gate line 101, and if the liquid crystal control electrode 111 is formed on the same plane on which the data line 103 is formed, the connection pattern is formed side by side with the data line 103.

As described above, in the present invention, the electric field distortion slits and the liquid crystal control electrode are formed on the same substrate (lower substrate) and the same liquid crystal control signal as the polarity of the pixel voltage applied to the pixel electrode. Accordingly, degradation of the viewing angle characteristics due to misalignment between the upper and lower substrates can be prevented and the viewing angle can be effectively widen by making the divided domains to be symmetrical based on the liquid crystal control electrode.

However, since the liquid crystal control electrode is made of an opaque metal, an aperture ratio is degraded. Especially, under a black condition, the same common voltage is applied to the pixel electrode and the common electrode, and the maximum liquid crystal control signal (Vmax) is applied to the liquid crystal control electrode. In this respect, light leakage occurs near the electric field distortion slit due to the signal applied to the liquid crystal control electrode. In order to prevent the light leakage under the black condition, the width of the liquid crystal control electrode needs to be sufficiently wide, thereby reducing the aperture ratio.

Figure 7:
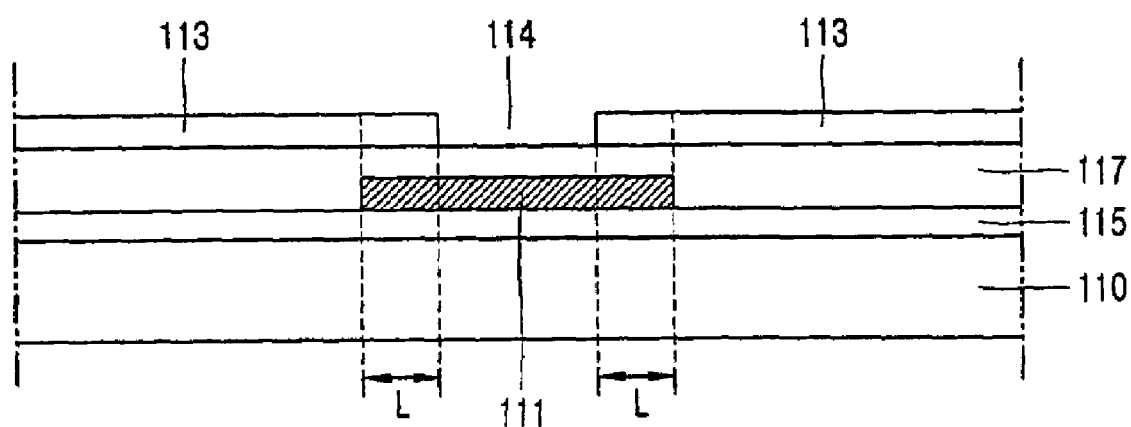
FIG. 7 illustrates a liquid crystal control electrode formed at a region corresponding to an electric field distortion slit, especially formed on a gate insulation film.

FIG. 7 illustrates the liquid crystal control electrode 111 formed at a region corresponding to the electric field distortion slit 114, especially formed on the gate insulation film 115. As shown in FIG. 7, the liquid crystal control electrode 111 is formed to overlap with the certain portions of the pixel electrodes 113 adjacent with the electric field distortion slit 114 with the passivation film 117 interposed therebetween. In such an arrangement, in order to prevent the light leakage from one side (the region adjacent to the electric field distortion slit 114) of the pixel electrode 113 under the black condition, regions where the light leakage occurs are all to be block with the liquid crystal control electrode 111. Accordingly, both sides of the liquid crystal control electrode 111 overlap with the pixel electrodes 113, and an overlap distance (L) is about 2~3 μm. Thus, an increase in the width of the liquid crystal control electrode 111 to prevent light leakage under the black condition reduces the aperture ratio.

In order to solve the problem, the present invention provides a multi-domain LCD device that minimizes the reduction of the aperture ratio by changing the form of the liquid crystal control electrode 111 to enhance light transmittance. In other words, the light transmittance can be enhanced by continuously disposing oval electric field distortion slits 114 with a certain interval therebetween and reducing a formation area of the liquid crystal control electrode 111 corresponding to the separation distance between the electric field distortion slits.

Figure 8:
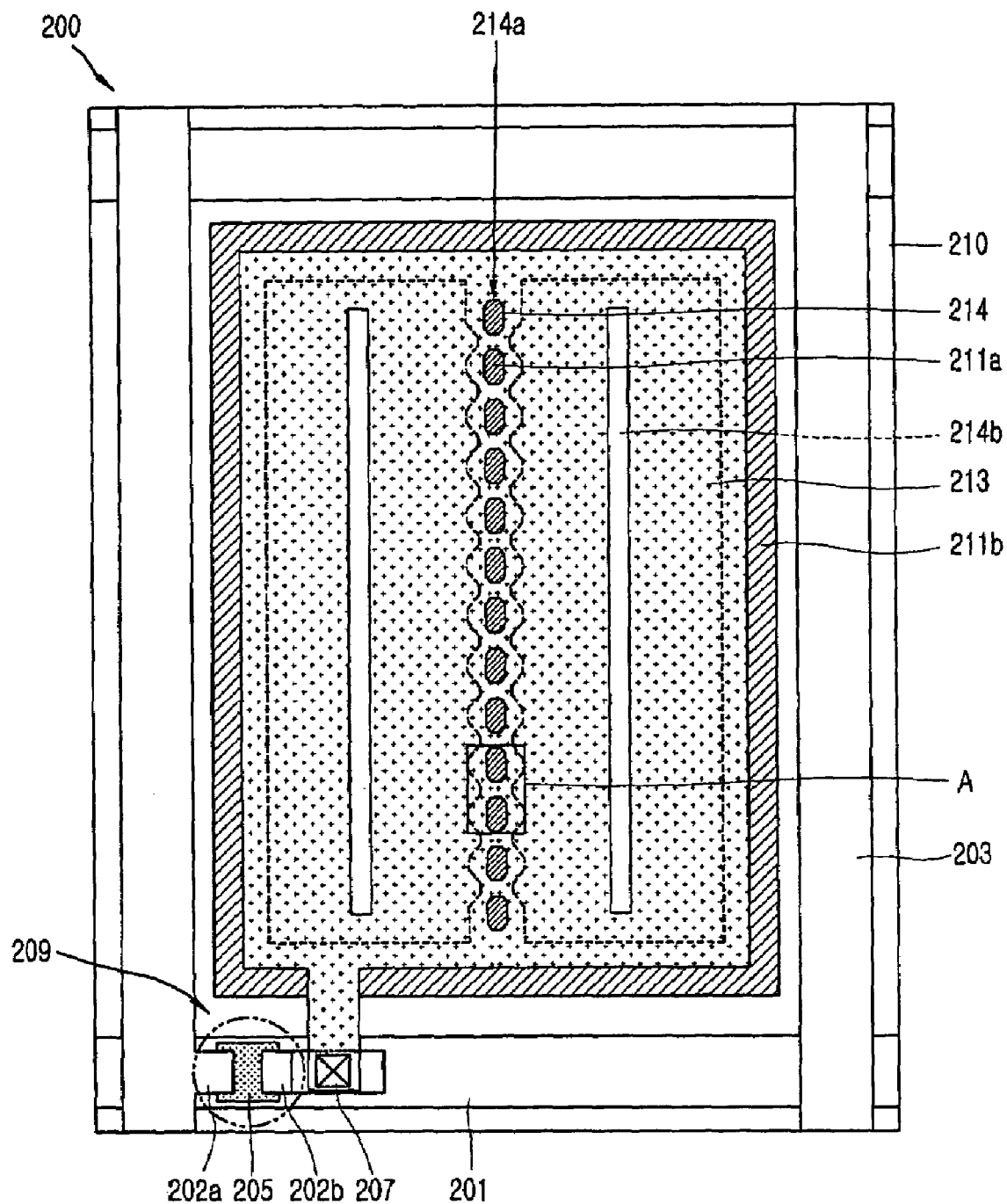
FIG. 8 is a plan view showing another embodiment of the present invention capable of improving light transmittance.

FIG. 8 is a plan view showing another exemplary embodiment of the present invention capable of improving the light transmittance. Elements of this embodiment are the same as those of the previous embodiment (FIGS. 3A and 3B), except for the structure of the liquid crystal control electrode.

As shown in FIG. 8, an LCD device 200 includes a first substrate 210, gate and data lines 201, 203 vertically crossing to form a pixel region on the first substrate 210, and a switching device 209 formed at the crossing of the gate and data lines 201 and 203 to switch each pixel. A pixel electrode 213 is formed at the pixel region to electrically connect a drain electrode 202b through a drain contact hole 207, and includes a plurality of first and second electric field distortion slits 214a and 214b.

A first liquid crystal control electrode 211a for distorting electric field together with the first electric field distortion slit 214a is formed at a lower side of the first electric field distortion slit 214a, and a second liquid crystal control electrode 211b for shielding a signal of the data line 203 is formed at an outer edge of the pixel region. The first electric field distortion slit 214a includes a plurality of oval holes 214 dispose in a straight line with a certain interval, and the first liquid crystal control electrode 211a is shaped such that its width is reduced at a position corresponding to a separation distance of the holes 214.

Figure 9A:
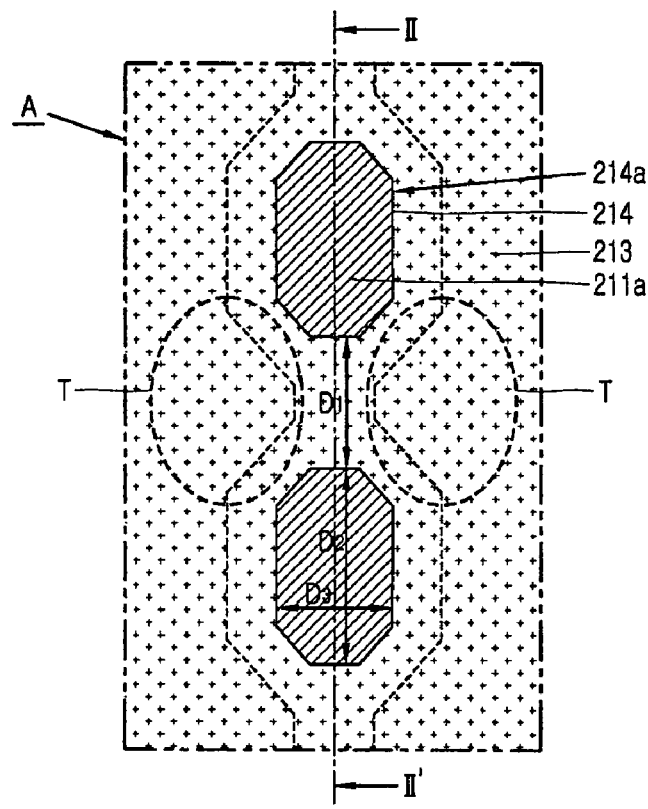
Figure 9B:
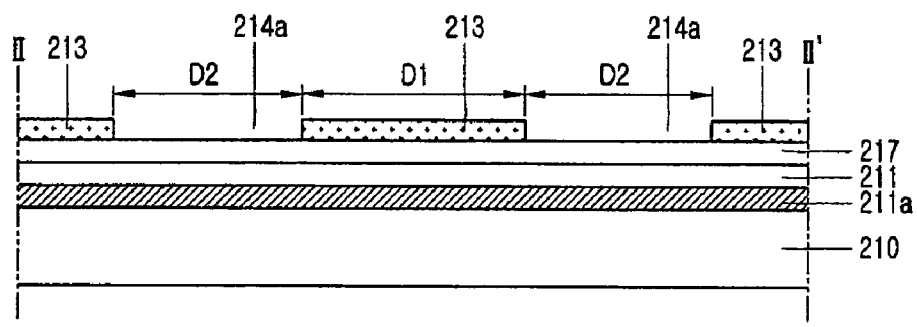
Figure 9C:
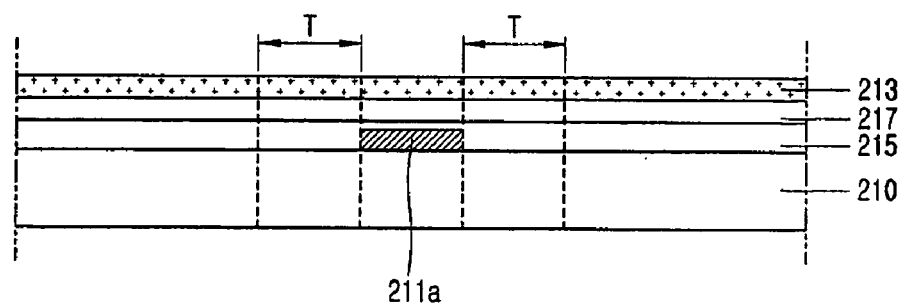

FIGS. 9A to 9C are enlarged views illustrating the first electric field distortion slit 214a and the first liquid crystal control electrode 211a. Specifically, FIG. 9A is an enlarged view of a portion 'A' in FIG. 8, FIG. 9B is a sectional view taken along line II-II' in FIG. 9A, and FIG. 9C is a sectional view taken along line III-III' in FIG. 9A.

First, as shown in FIG. 9A, the first electric field distortion slit 214a positioned between the second electric field distortion slit 214b is formed such that the plurality of holes 214 are arranged separately with a certain interval (D1) in a row. The hole 214 has an oval shape and its vertical length (D2) and horizontal length (D3) are different. For example, the length (vertical length; D2) in the direction of arrangement of the holes 214 is longer. The separation distance (D1) between the holes 214 is designed to be smaller than the vertical length (D2) and the same or smaller than the horizontal length (D3).

The first liquid crystal control electrode 211a formed at the lower side of the first electric field distortion slit 214a has a similar form as the first electric field distortion slit 214a, and regions corresponding to the separation region between the holes 214 are connected. In other words, the region separating the holes 214, namely, the first liquid crystal control electrode 211a corresponding to the length D1, is smaller in its width compared with the region corresponding to the hole 214. This means reduction of the formation area of the first liquid crystal control electrode 211a compared with the previous embodiment (FIG. 3A), and the aperture ratio increases as much as the region (T) formed as the width of the first liquid crystal control electrode 211a becomes narrow.

That is, in this exemplary embodiment, the oval holes 214 whose vertical length (D2) is longer than the horizontal length (D3) are arranged at certain intervals (D1) to form the first electric field distortion slit 214a, and the width of the first liquid crystal control electrode 211a formed at its lower side has the width which becomes narrow at the separation region between holes 214 to thereby reduce the area of the first liquid crystal control electrode 211a formed at the separation region between holes 214 and increase the aperture ratio.

As shown in FIGS. 9A and 9B, the first liquid crystal control electrode 211a is formed on the first substrate 210. A gate insulation film 215 and a passivation film 217 are formed on the entire surface of the first substrate 210 including the first liquid crystal control electrode 211a. The pixel electrode 213 is formed on the passivation film 217. The first liquid crystal control electrode 211a may be formed on the gate insulation film 215.

As described above, the first electric field distortion slit 214a is formed to include the plurality of holes 214, and the form of the first liquid crystal control electrode 211a is changed to increase the aperture ratio. Moreover, the separation region (D1) between the holes 214 is smaller than the vertical length (D2) of the hole 214 and the same or smaller than the horizontal length (D3) of the hole 214. In this exemplary embodiment, with the first electric field distortion slit 214a being shaped as the continuous holes, a different electric field from the linear second electric field distortion slit 214b is generated around the holes. However, the other region than the hole periphery has the same electric field as in the previous embodiment, and since the hole periphery is blocked by the liquid crystal control electrode, there is no problem.

Figure 10:
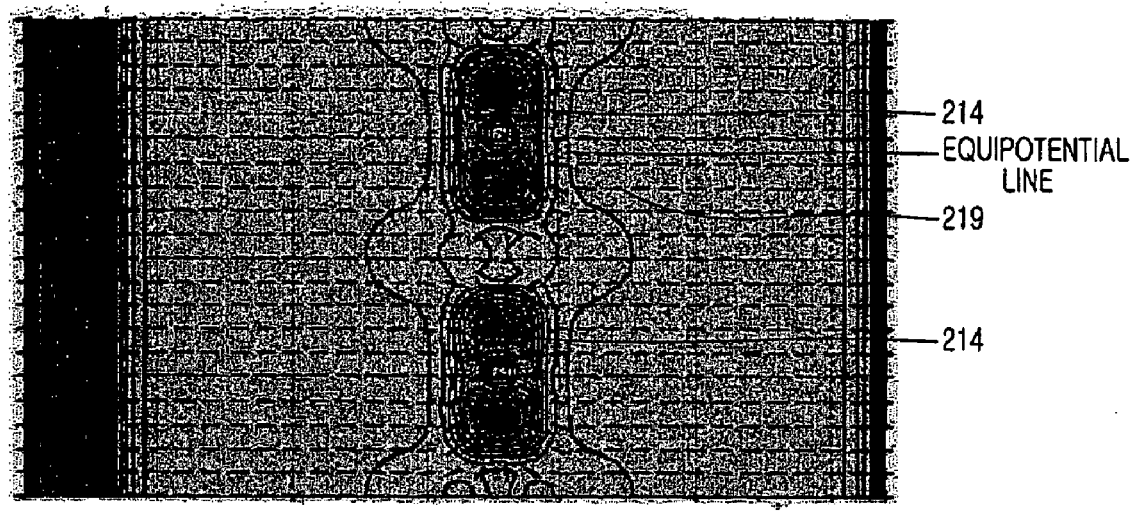
FIG. 10 illustrates an equipotential line in a pixel including a region (hole peripheral region) corresponding to FIG. 9A.
Figure 11A:
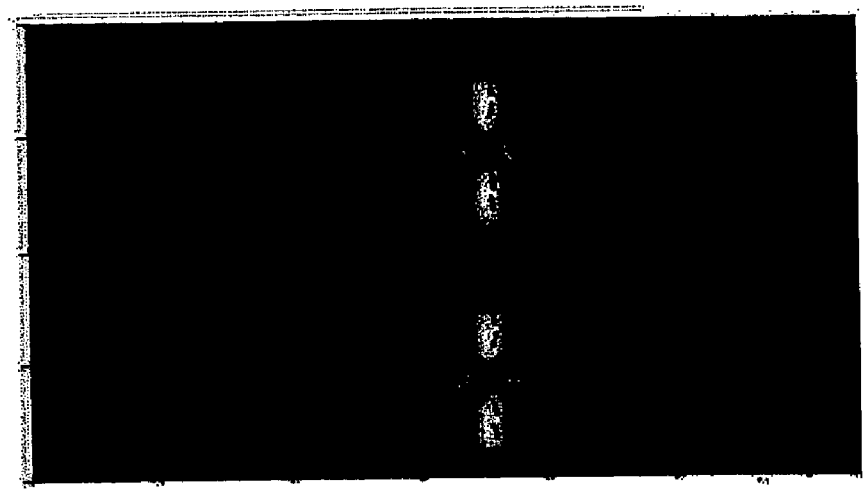
FIGS. 11A and 11B are images showing a light leakage region in a black mode and a light blockage region in a white mode, respectively.
Figure 11B:
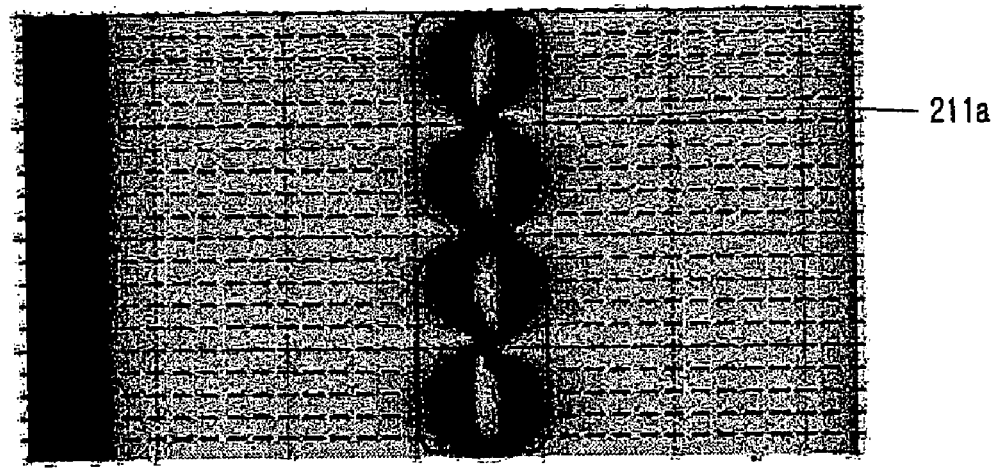

FIG. 10 illustrates an equipotential line in a pixel including a region (hole peripheral region) corresponding to FIG. 9A. FIGS. 11A and 11B are images showing a light leakage region in a black mode and a light blockage region in a white mode, respectively.

First, referring to FIG. 10, an equipotential line is formed at the periphery of the holes 214, and electric field (not shown) is generated in a direction perpendicular to the equipotential line. Liquid crystal molecules 219 are driven in the direction of the electric field. As shown in FIG. 11A, the light leakage occurs along the periphery of the holes 214 in the black mode. As shown in FIG. 11B, a light blocked region is generated along the hole periphery in the white mode. In this exemplary embodiment, the light leakage region and the light blockage region around the holes 214 are regions covered by the first liquid crystal control electrode 214a.

Figure 13:
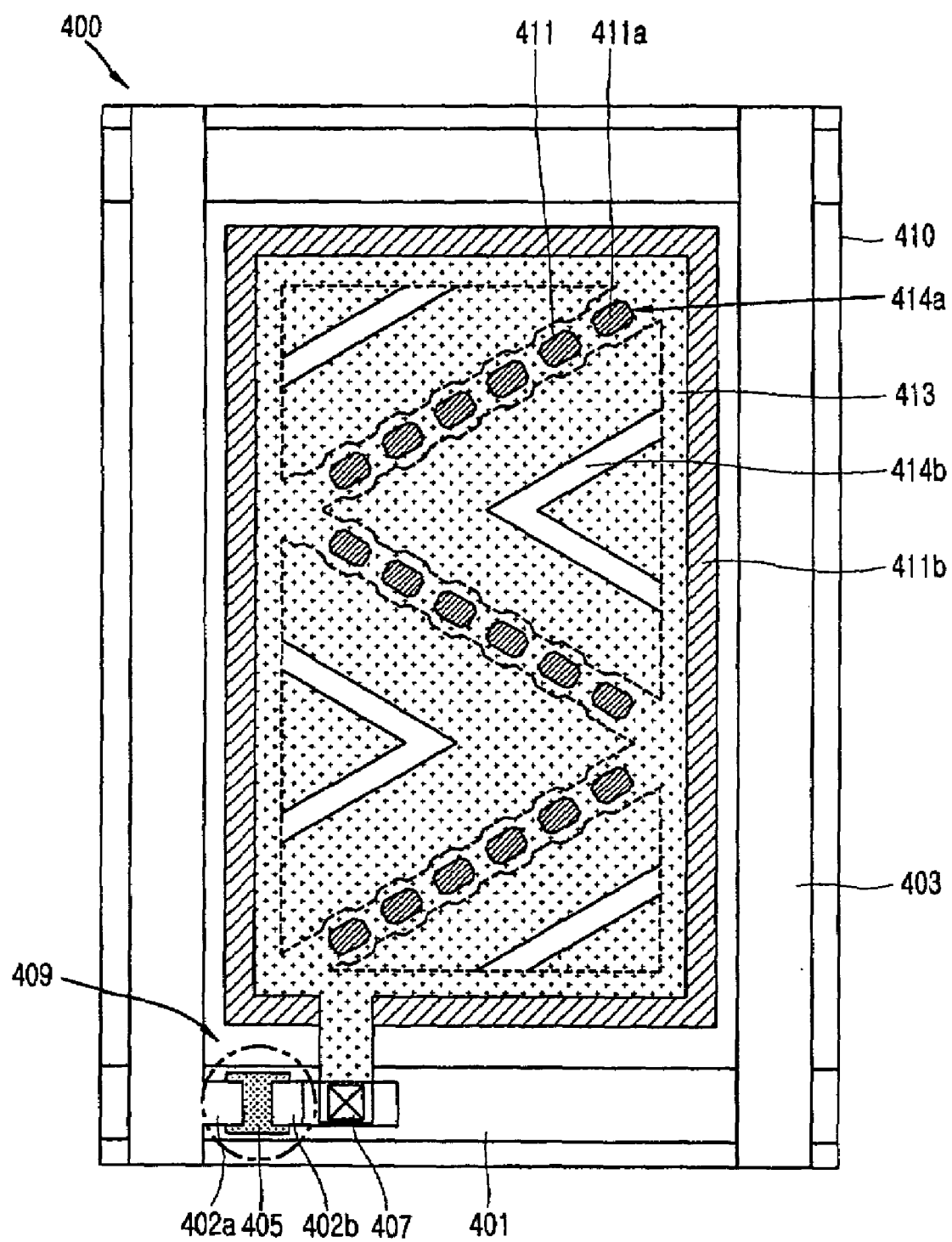

FIGS. 12 and 13 show another exemplary embodiment of the present invention, whose structure is the same as the previous embodiment (FIG. 6) except for the form of the liquid crystal control electrode and the electric field distortion slit.

First, as shown in FIG. 12, an LCD device 300 includes a gate line 301 and a data line 303 defining a pixel region horizontally and vertically on a first substrate 310, and a pixel electrode 313 formed at the pixel region. The pixel electrode 313 includes a plurality of first and second electric field distortion slits 314a and 314b as an electric field distortion unit. The first electric field distortion slit 314a is formed to include a plurality of holes 314 continuously disposed.

A first liquid crystal control electrode 311a is formed on the first substrate 310 corresponding to the first electric field distortion slit 314a, and its width is reduced at a region corresponding to a separation region between the holes 314. A second liquid crystal control electrode 311b for effectively blocking an influence of a signal of the data line 303 on the pixel electrode 313 is formed at an outer edge of the pixel region adjacent to the data line 303. The first and second liquid crystal control electrodes 311a and 311b may be formed on the same plane as the gate line 301 or the data line 303. Though not shown, similar to the previous embodiment described above with reference to FIG. 3B, there are provided a second substrate including a color filter, a black matrix and a common electrode, and a liquid crystal layer formed between the first and second substrates.

In the LCD device 300, when a voltage is applied to the pixel electrode 313, the common electrode and the liquid crystal control electrodes 311a and 311b, liquid crystal molecules of the liquid crystal layer are arranged such that each of their longer axes points toward the first electric field distortion slit 314a to form a continuous domain. The electric field distortion slits 314a and 314b and the liquid crystal control electrodes 311a and 311b distort electric field so that the liquid crystal molecules form a continuous domain at each divided region and improve viewing angle characteristics. At this time, a liquid crystal control signal applied to the liquid crystal control electrodes 311a and 311b must be changed according to polarity of the pixel voltage applied to the pixel electrode 313.

That is, in a case where a signal of the pixel voltage has a negative polarity, a liquid crystal control signal ($V_{min}$) lower than the pixel voltage ($V_{p(-)}$) is applied to the liquid crystal control electrodes 311a and 311b, and if the signal of the pixel electrode has a positive polarity ($V_{p(+)}$), a liquid crystal control signal ($V_{max}$) higher than the pixel voltage ($V_{p(+)}$) is applied to the liquid crystal control electrodes 311a and 311b. In this exemplary embodiment, a voltage difference ($V_{p(-)}-V_{min}$) between the minimum liquid crystal control signal ($V_{min}$) and the pixel voltage ($V_{p(-)}$) and a voltage difference ($V_{max}-V_{p(+)}$) between the maximum liquid crystal control signal ($V_{max}$) and the pixel voltage ($V_{p(+)}$) must satisfy the same conditions.

FIG. 13 shows another exemplary embodiment of the present invention. As shown in FIG. 13, an LCD device 400 includes a first substrate 410, gate and data lines 401 and 403 defining a pixel region horizontally and vertically on the first substrate 410, and a pixel electrode 413 formed at the pixel region. The pixel electrode 413 includes a plurality of electric field distortion slits 414a and 414b as an electric field distortion unit. The electric field distortion slits 414a and 414b have a bent structure in a zigzag form, and especially, the electric field distortion slit 414a includes a plurality of holes 414 that are continuously disposed.

The pixel region includes liquid crystal control electrodes 411a and 411b forming a multi-domain by distorting electric field together with the electric field distortion slits 414a and 414b. The liquid crystal control electrode 411a has the same bent structure as the slits 414a and 414b. In this exemplary embodiment, the electric field distortion slits and the liquid crystal control electrodes may be formed in the bent structure to create 4-domain. Also, the liquid crystal control electrode 411a is formed such that a width of a region corresponding to a region between holes 414 is narrower than a region corresponding to the hole 414. The liquid crystal control electrode 411b is formed at an outer edge of the pixel region adjacent to the data line 403 so that an influence of a signal of the data line 403 on the pixel electrode 413 can be effectively blocked. The liquid crystal control electrodes 411a and 411b may be formed on the same plane on which the gate line 410 or the data line 403 is formed. Though not shown, similar to the previous embodiment described above with reference to FIG. 3B, there are formed a second substrate including a color filter, a black matrix and a common electrode, and a liquid crystal layer formed between the first and second substrates.

In the LCD device with the above-described structure, when a voltage is applied to the pixel electrode 413, the common electrode and the liquid crystal control electrodes 411a and 411b, liquid crystal molecules of the liquid crystal layer form four domains having the same arrangement of liquid crystal molecules based on the liquid crystal control electrodes 411a and 411b. In order to form the same arrangement of liquid crystal molecules based on the liquid crystal control electrodes 411a and 411b, a liquid crystal control signal applied to the liquid crystal control electrodes 411a and 411b must be changed according to polarity of the pixel voltage applied to the pixel electrode 413.

That is, in a case where a signal of the pixel voltage has a negative polarity, a liquid crystal control signal ($V_{min}$) lower than the pixel voltage ($V_{p(-)}$) is applied to the liquid crystal control electrodes 411a and 411b, and if the signal of the pixel electrode has a positive polarity ($V_{p(+)}$), a liquid crystal control signal ($V_{max}$) higher than the pixel voltage ($V_{p(+)}$) is applied to the liquid crystal control electrodes 411a and 411b. In this exemplary embodiment, a voltage difference ($V_{p(-)}-V_{min}$) between the minimum liquid crystal control signal ($V_{min}$) and the pixel voltage ($V_{p(-)}$) and a voltage difference ($V_{max}-V_{p(+)}$) between the maximum liquid crystal control signal ($V_{max}$) and the pixel voltage ($V_{p(+)}$) must satisfy the same conditions. Also in the exemplary embodiments of FIGS. 12 and 13, a connection pattern electrically connecting the liquid crystal control electrodes between adjacent pixels is separately formed. The connection pattern may be formed in parallel to the gate line or may be formed in parallel to the data line.

Figure 14A:
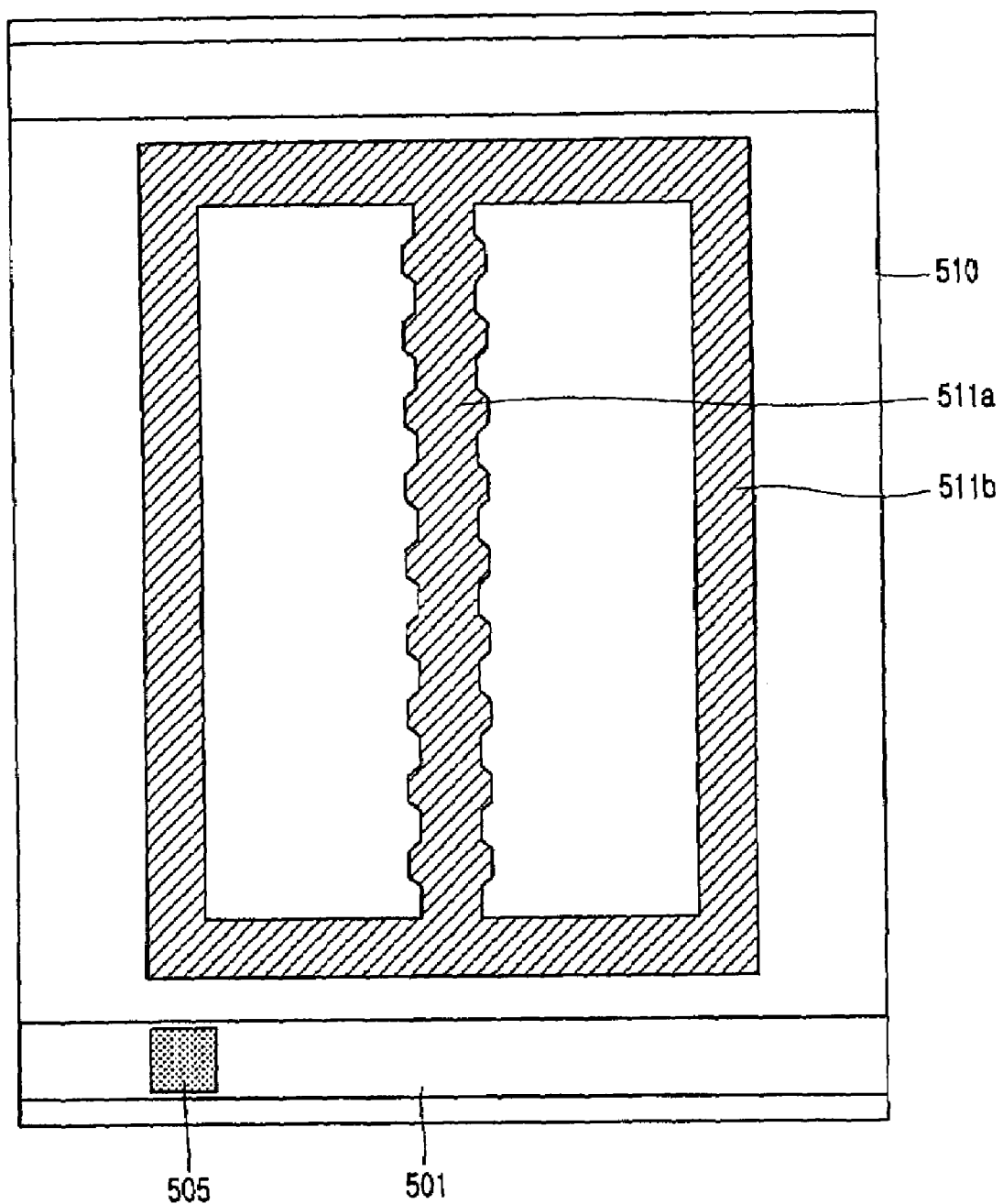
FIGS. 14A to 14C are process plan views showing a method for fabricating an LCD device illustrated in FIG. 8.
Figure 14B:
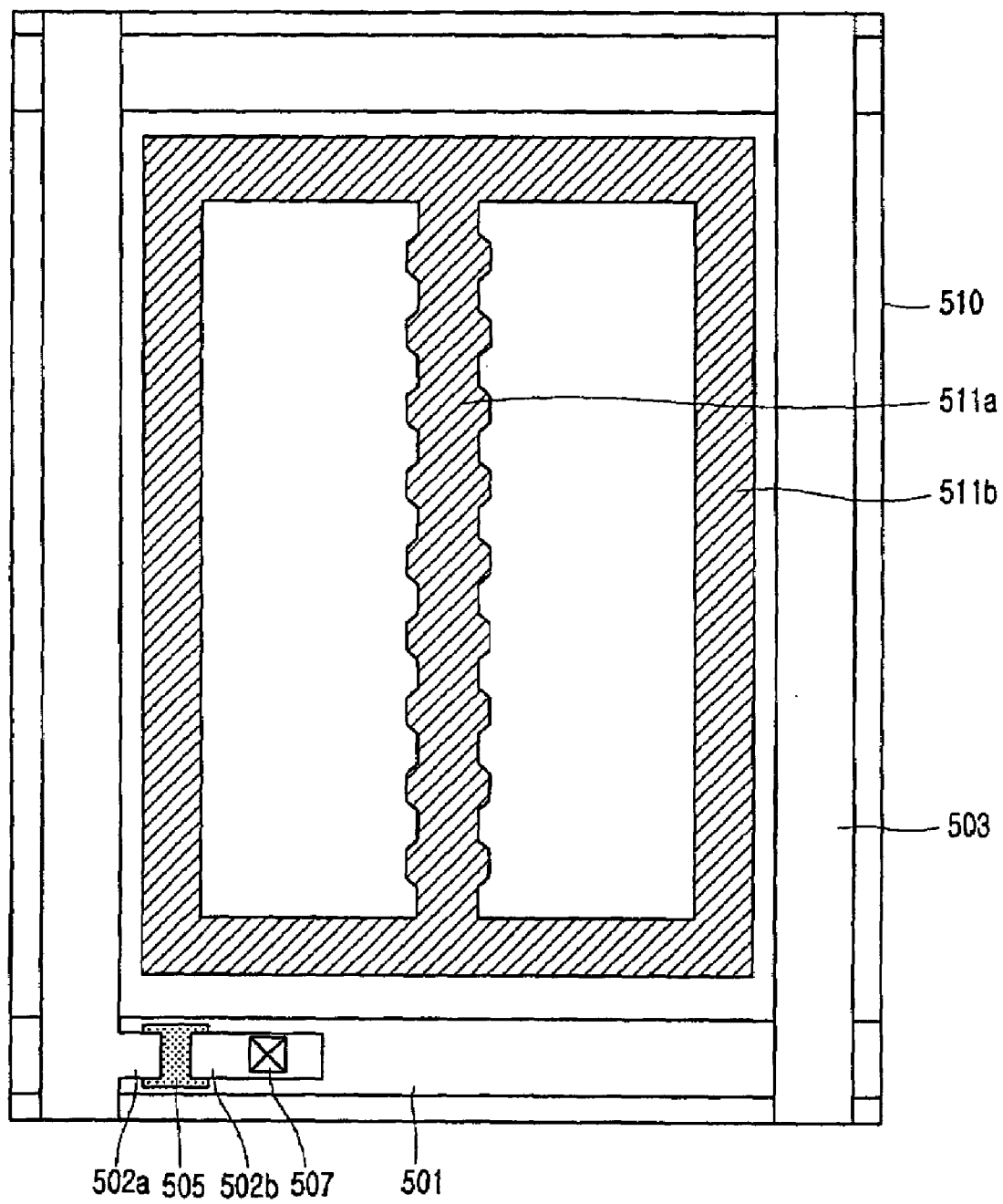
Figure 14C:
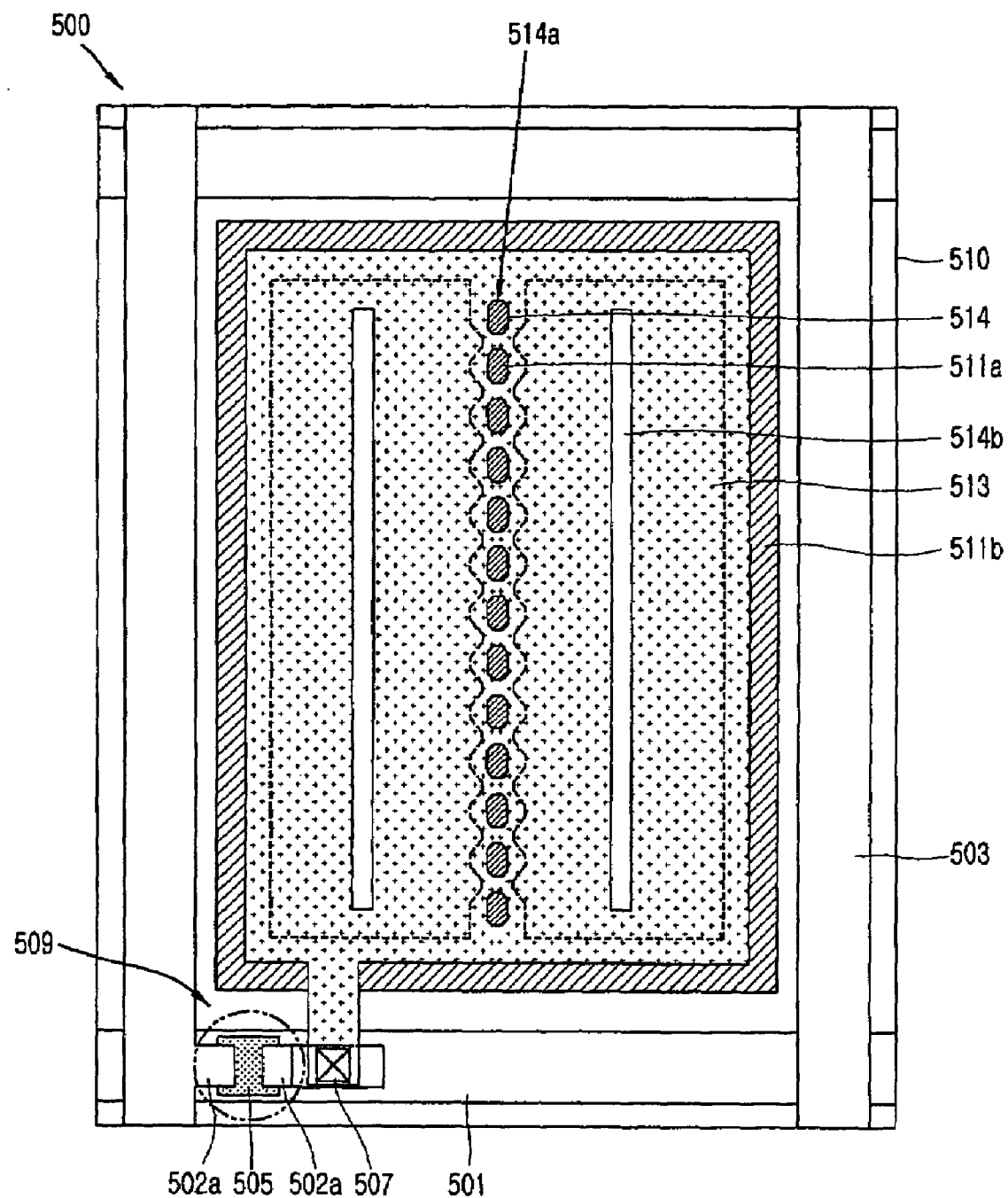

FIGS. 14A to 14C are views showing a method for fabricating a multi-domain LCD device, and specifically, showing a method for fabricating the LCD according to the exemplary embodiment (FIGS. 3A and 3B) of the present invention.

First, as shown in FIG. 14A, a transparent first substrate 510 is prepared, on which a first metal material such as Cu, Ti, Cr, Al, Mo, Ta or an Al alloy is deposited and then patterned to form a gate line 501 and first and second liquid crystal control electrodes 511a and 511b. In this exemplary embodiment, the liquid crystal control electrodes 511a and 511b may be formed in a follow-up process, and the first liquid crystal control electrode 511a is formed such that its width becomes narrow at certain intervals.

Thereafter, SiNx or SiOx, or the like, is deposited by a plasma CVD method on the entire surface including the gate line 501 and the liquid crystal control electrodes 511a and 511b to form a gate insulation film (not shown). Amorphous silicon and n+amorphous silicon are stacked on the gate insulation film and then patterned to form a semiconductor layer 505 on the gate line 501.

Referring to FIG. 14B, after the semiconductor layer 505 is formed, a second metal material such as Cu. Mo, Ta, Al, Cr. Ti or Al alloy is deposited on the semiconductor layer 505 and the gate insulation film (not shown), and then patterned to form a data line 503 disposed to be perpendicular to the gate line 501, thereby defining a pixel together with the gate line 501 and source/drain electrodes 502a and 502b separated with a certain interval therebetween on the semiconductor layer 505. If the liquid crystal control electrodes 511a and 511b are not formed during the process of forming the gate line 501, they may be formed during the process of forming the data line 503.

Subsequently, an inorganic material such as SiNx or SiOx or an organic material such as benzocyclobutene or acryl is coated on the substrate 510 on which a TFT 509 has been formed, to form a passivation film (not shown), and then, a drain contact hole 507 exposing a portion of the drain electrode 502b is formed.

And as shown in FIG. 14C, a transparent conductive film such as ITO or IZO is deposited on the passivation film and then patterned to form a pixel electrode 513. Thereafter, a plurality of electric field distortion slits 514a and 514b for forming a plurality of domains by distorting electric field together with the liquid crystal control electrodes 511a and 511b. The electric field distortion slit 514a includes a plurality of holes 514 continuously arranged with certain intervals therebetween, and a separation region between the holes 514 is positioned at a region where the width of the liquid crystal control electrode 511a is narrow. Though not shown, a second substrate having a black matrix, a color filter and a common electrode formed thereon is prepared, and the first and second substrates are attached, between which a liquid crystal layer is formed to complete a panel of the LCD device.

As described above, in the exemplary embodiments of the present invention, the light transmittance can be enhanced by forming the normal multi-domain, which is generated created by forming the liquid crystal control electrodes, constructing oval electric field distortion slits continuously disposed with a certain distance, and reducing the formation area of the liquid crystal control electrodes.

The multi-domain LCD device in accordance with the present invention has many advantages. That is, by forming the electric field distortion unit only at the lower substrate, degradation of the viewing angle characteristics due to misalignment of the upper substrate and the lower substrate can be prevented, and by implementing the wide viewing angle by forming the multi-domain, a display quality can be further enhanced. In addition, minimizing the reduction of the aperture ratio by changing the forming of the liquid crystal control electrode can enhance the light transmittance.

It will be apparent to those skilled in the art that various modifications and variation can be made in the multi-domain liquid crystal display device and its fabrication method of the present invention without departing from the spirit or scope of the invention. Thus, it is intended that the present invention cover the modifications and variations of this invention provided they come within the scope of the appended claims and their equivalents.

What is claimed is:

1. A multi-domain LCD device comprising:
   a first substrate and a second substrate facing each other;
   gate lines and data lines defining a plurality of pixel regions on the first substrate;
   liquid crystal control electrodes formed at the central region and the peripheral region of the pixel regions, the liquid crystal control electrodes at the central region and the peripheral region being formed on the same layer;
   a pixel electrode formed at the plurality of the pixel regions;
   a plurality of electric field distortion slits formed in the pixel electrodes;
   a common electrode formed on the second substrate; and
   a liquid crystal layer formed between the first and second substrates, wherein the liquid crystal layer includes liquid crystal molecules that are symmetrically arranged by the first electric field distortion unit, and a plurality of domains formed by the first and second electric field distortion units,
wherein a pixel voltage is applied to the pixel electrode and a electric field distortion voltage is applied to the liquid crystal control electrodes at the central region and the peripheral region of the pixel region.

2. The device of claim 1, wherein the electric field distortion slit includes a first slit having a plurality of holes continuously arranged at a certain interval and a plurality of second slits disposed at both sides of the first slit.

3. The device of claim 2, wherein the liquid crystal control electrodes include a first region corresponding to an interval between any adjacent two of the plurality of holes of the first slit and a second region corresponding to any one of the plurality of holes forming the first electric field distortion slit, the first region being narrower than the second region.

4. The device of claim 3, wherein the hole is formed such that a vertical length of the hole is longer than a horizontal length of the hole in a disposition direction of the hole.

5. The device of claim 4, wherein the interval between any adjacent two of the plurality of holes is smaller than the vertical length of the hole.

6. The device of claim 4, wherein the interval between any adjacent two of the plurality of holes is the same as the horizontal length of the hole.

7. The device of claim 4, wherein the interval between any adjacent two of the plurality of holes is smaller than the horizontal length of the hole.

8. The device of claim 1, wherein the liquid crystal control electrode is formed on the same plane on which the gate lines are formed.

9. The device of claim 8, wherein a gate insulation film and a passivation film are formed between the liquid crystal control electrode and the electric field distortion slits.

10. The device of claim 1, wherein the liquid crystal control electrode is formed on the same plane on which the data lines are formed.

11. The device of claim 10, further comprising a passivation film that is formed between the liquid crystal control electrode and the electric field distortion slits.

12. The device of claim 1, further comprising a color filter and a black matrix that are formed on the second substrate.

13. The device of claim 1, wherein the first and second electric field distortion units have a bent structure.

14. The device of claim 1, further comprising a connection pattern for electrically connecting the first electric field distortion unit to adjacent pixels.

15. The device of claim 1, wherein when a pixel voltage applied to the pixel electrode is a negative polarity voltage ($V_{p(-)}$), a minimum electric field distortion voltage ($V_{min}$) lower than the negative polarity pixel voltage ($V_{p(-)}$) is applied to the liquid crystal control electrode, and when the pixel voltage applied to the pixel electrode is a positive polarity voltage ($V_{p(+)}$), a maximum electric field distortion voltage ($V_{max}$) higher than the positive pixel voltage ($V_{p(+)}$) is applied to the liquid crystal control electrode.

16. The device of claim 1, wherein the liquid crystal control electrode is formed as an interconnection.

17. A method for fabricating a multi-domain liquid crystal display (LCD) device comprising:
preparing a first substrate and a second substrate, the first substrate including gate and data lines to define a plurality of pixel regions;
forming a first liquid crystal control electrode and a second liquid crystal control electrode on the first substrate, the first liquid crystal control electrode and the second liquid crystal control electrode being formed on the same layer;
forming a passivation film on the first substrate including the plurality of liquid crystal control electrodes;
forming a pixel electrode on the passivation film;
forming a first electric filed distortion slit and a second electric field distortion slit in the pixel electrode;
forming a common electrode on the second substrate; and
forming a liquid crystal layer including a symmetrical arrangement based on the first liquid crystal control electrode, and a plurality of domains by the first liquid crystal control electrode and the first electric field distortion slit,
wherein a pixel voltage is applied to the pixel electrode and a electric field distortion voltage is applied to the first liquid crystal control electrode and the second liquid crystal control electrode.

18. The method of claim 17, further comprising:
forming a gate line and a data line defining a pixel region on the first substrate; and
forming a thin transistor film at a crossing of the gate line and the data line.

19. The method of claim 18, wherein forming the first and second liquid crystal control electrodes comprises:
forming the second liquid crystal control electrode disposed along an outer edge of the pixel region; and
forming the first liquid crystal control electrode having a first region corresponding to the interval between the holes of the first electric field distortion slit and a second region corresponding to the first electric field distortion slit, the first region being narrower than the second region.

20. The method of claim 18, wherein the first and second liquid crystal control electrodes are formed simultaneously when the gate line is formed.

21. The method of claim 18, wherein the first and second liquid crystal control electrodes are formed simultaneously when the data line is formed.

22. The method of claim 17, wherein the first electric field distortion slit includes a plurality of holes continuously disposed to be spaced apart at an interval.

* * * * *